United States Patent Office 3,210,333
Patented Oct. 5, 1965

3,210,333
FLUIDIZING POLYMER SOLUTION
Charles W. Strobel, Bartlesville, Okla., assignor to Phillips Petroleum Company, a corporation of Delaware
No Drawing. Filed Jan. 3, 1961, Ser. No. 79,983
5 Claims. (Cl. 260—94.7)

This invention relates to a method of fluidizing polymer solutions. In one of its more specific aspects, it relates to an improved method for carbonating polymers by reducing the viscosity of the polymer solution without substantially increasing the bulk of the solution.

It has been disclosed in copending application Serial No. 772,167 of Uraneck, Short, Hsieh and Zelinski, filed November 6, 1958, now Patent Number 3,135,716, that highly useful polymeric products can be obtained by polymerizing vinylidene-containing monomers in the presence of an organo alkali metal catalyst and subsequently reacting the resulting polymer containing active alkali metal end groups with a reagent which will couple the polymer molecules or replace the alkali metal with more stable reactive end groups. The utilization of these reactive terminal groups on the polymer molecule enables substantially more effective cures since all of the molecule can be tied into the crosslinked structure. Also by simple coupling arrangements alone or with auxiliary curing, liquid polymers can be readily converted into solids and soft tacky polymers can be made quite rigid. The term "telechelic" has been coined to define these terminally reactive polymers. As used in this specification, telechelic polymers means polymers of vinylidene-containing monomers which contain a reactive group on each end of the polymer molecule.

In the copending application of Zelinski, Serial No. 64,280, filed October 24, 1960, it is disclosed that polymers of reduced vinyl content, thereby having lowered freeze points, can be obtained by polymerizing conjugated dienes in the presence of organo polylithium initiators in hydrocarbon diluents and in the substantial absence of polar solvents. Since the organo polylithium polymerization initiators are ordinarily prepared in polar solvents, this necessitates removing all or at least part of the polar solvent prior to charging the initiator to the polymerization diluent. In the copending application of Short, Serial No. 50,310, filed August 18, 1960, an improved method of carbonating polymers containing terminally reactive alkali metal atoms is disclosed wherein the polymer solutions are contacted with gaseous carbon dioxide under conditions of turbulence whereby intimate and immediate contact is brought about between the polymer solution and the carbon dioxide. When the low vinyl polymers prepared according to the process of Zelinski are carbonated according to the process of Short, difficulties are frequently encountered because of the high viscosity of the polymer solutions.

I have now discovered that polymer solutions prepared from conjugated diene polymers containing at least two terminal lithium atoms per molecule in a hydrocarbon solvent can be greatly increased in fluidity by adding to the solution a surprisingly small amount of a material which is either an aliphatic ether, a cyclic ether or a trialkylamine. Our invention is particularly important in the treatment of polymerization solutions which result when the polymer is formed in hydrocarbon diluent and in the substantial absence of polar solvent. The improved fluidity of the polymer solutions greatly enhances the carbonation of the polymer by contact with gaseous carbon dioxide.

It is an object of my invention to provide a method of fluidizing polymer solutions.

Another object of my invention is to provide a method of fluidizing polymer solutions which result when a polymer is prepared in a hydrocarbon diluent and in the substantial absence of a polar solvent.

Still another object is to provide an improved method of carbonating polymer solutions containing terminally reactive lithium atoms wherein said polymer has been formed by contacting a conjugated diene with an organo polylithium initiator in a hydrocarbon diluent and in the substantial absence of a polar solvent.

Other objects, advantages and features of my invention will be apparent to those skilled in the art from the following disclosure.

The polymers which can be prepared according to this invention are polymers of conjugated dienes containing from 4 to 12 carbon atoms and preferably from 4 to 8 carbon atoms per molecule. Examples of these compounds include the following: 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl-1,3-butadiene, 2,3-diethyl-1,3-butadiene, 2,3-di-n-propyl-1,3-butadiene, 2-methyl-3-isopropyl-1,3-butadiene, and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene, and allowing it to polymerize. It is preferred, however, to carry out the polymerization with conjugated diolefins, such as butadiene with isoprene and piperylene also being especially suitable.

In addition to homopolymers and copolymers of conjugated dienes, copolymers of conjugated dienes with other monomers containing a $CH_2=C<$ group, such as vinyl-substituted aromatic compounds, can be made by the process of this invention. The vinyl-substituted aromatic compounds include styrene, 1-vinyl-naphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include 3-methylstyrene (3-vinyltoluene), 3,5-diethylstyrene, 4-n-propylstyrene, 2,4-6-trimethylstyrene, 4-dodecylstyrene, 3-methyl-5-n-hexylstyrene, 4-cyclohexylstyrene, 4-phenylstyrene, 2-ethyl-4-benzylstyrene, 4-p-tolylstyrene, 3,5-diphenylstyrene, 2,4,6-tri-tert-butylstyrene, 2,3,4,5-tetramethylstyrene, 4-(4-phenyl-n-butyl)styrene, 3-(4-n-hexylphenyl)styrene, 4-methoxystyrene, 3,5-diphenoxystyrene, 3-decoxystyrene, 2,6-dimethyl-4-hexoxystyrene, 4-dimethylaminostyrene, 3,5-diethylaminostyrene, 4-methoxy-6-di-n-propylaminostyrene, 4,5-dimethyl-1-vinylnaphthalene, 3-ethyl-1-vinyl-naphthalene, 6 - isopropyl-1-vinylnaphthalene, 2,4-diisopropyl-1-vinylnaphthalene, 3,6-di-p-tolyl-1-vinylnaphthalene, 6-cyclohexyl-1-vinylnaphthalene, 4,5-diethyl-8-octyl-1-vinylnaphthalene, 3,4,5,6-tetramethyl-1-vinylnaphthalene, 3,6 - di - n - hexyl - 1 - vinylnaphthalene, 8-phenyl-1-vinylnaphthalene, 5-(2,4,6-trimethylphenyl)-1-vinylnaphthalene, 3,6-diethyl - 2 - vinylnaphthalene, 7-dodecyl-2-vinylnaphthalene, 4-n-propyl-5-n-butyl - 2 - vinylnaphthalene, 6-benzyl-2-vinylnaphthalene, 3-methyl-5,6-diethyl-8-n-propyl-2-vinylnaphthalene, 4-o-tolyl-2-vinylnaphthalene, 5-(3-phenyl-n-propyl)-2 - vinylnaphthalene, 4-methoxy-1-vinylnaphthalene, 6-phenoxy-1-vinylnaphthalene, 3,6-dimethylamino-1-vinylnaphthalene, 7-dihexoxy-2-vinylnaphthalene, and the like. Block or random copolymers of conjugated dienes and vinyl-substituted aromatic compounds can be formed. The presence of a small amount of polar compound such as the solvent used in preparing the initiator encourages random copolymerization between conjugated dienes and vinyl-substituted aromatic compounds.

Block copolymers can also be prepared from conjugated dienes and polar monomers which are introduced after the conjugated diene has polymerized. These polar monomers include vinylpyridines and vinylquinolines such as 2-vinylpyridine,
4-vinylpyridine,
3,5-diethyl-4-vinylpyridine,
5-methyl-2-vinylpyridine,
5-n-octyl-2-vinylpyridine,
3-n-docecyl-2-vinylpyridine,
3,5-di-n-hexyl-4-vinylpyridine,
5-cyclohexyl-2-vinylpyridine,
4-phenyl-2-vinylpyridine,
3,5-di-tert-butyl-2-vinylpyridine,
3-benzyl-4-vinylpyridine,
6-methoxy-2-vinylpyridine,
4-phenoxy-2-vinylpyridine,
4-dimethylamino-2-vinylpyridine,
3,5-dimethyl-4-diamylamino-2-vinylpyridine,
2-vinylquinoline,
4-vinylquinoline,
2-tert-butyl-4-vinylquinoline,
3-methyl-4-vinylquinoline,
3-cyclohexyl-4-vinylquinoline,
3-methyl-4-ethoxy-2-vinylquinoline,
1-vinylisoquinoline,
3-vinylisoquinoline,
4-tert-dodecyl-1-vinylisoquinoline,
3-dimethylamino-3-vinylisoquinoline,
4-benzyl-3-vinylisoquinoline,
4-phenyl-1-vinylisoquinoline, and the like.

Other polar monomers include acrylic and alkacrylic acid esters, nitriles, and N,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N - dimethylacrylamide, N,N - diethylmethacrylamide, and the like. Vinylfuran and N-vinylcarbazol can also be used.

Telechelic polymers are prepared by polymerizing the above named monomers in the presence of an organo polylithium compound. These organo polylithium compounds contain from 2 to 4 lithium atoms per molecule. They are conveniently prepared in an ether medium in several ways, for example, by replacing halogens in an organic halide with lithium or by the direct addition of lithium to a double bond or by reacting an organic halide with a lithium containing compound.

The initiator can be represented by the formula $RLi_x$ where $x$ is an integer of 2 to 4 and R is a hydrocarbon radical selected from the group consisting of aliphatic, cycloaliphatic and aromatic radicals, preferably having 1 to 20 carbon atoms. Examples of suitable dilithium organic polymerization initiators which are prepared in polar solvents are 1,4-dilithiobutane,
1,6-dilithiohexane,
1,10-dilithiodecane,
1,20-dilithioeicosane,
1,4-dilithio-2-methyl-2-butene,
1,4-dilithio-2-butene, dilithionaphthalene,
4,4′-dilithiobiphenyl, dilithioanthracene,
1,2-dilithio-1,1-diphenylethane,
1,2-dilithio-1,2-diphenylethane,
1,2-dilithiotetraphenylethane,
1,2-dilithio-1-phenyl-1-naphthylethane,
1,2-dilithio-1,2-dinaphthylethane,
1,2-dilithiotrinaphthylethane,
1,4-dilithiocyclohexane,
1,3,5-trilithiocyclohexane,
1-lithio-4(2-lithiomethylphenyl)butane,
1,2-di(lithiobutyl)benzene,
1,3-dilithio-4-ethylbenzene,
1,5,12-trilithiododecane,
1,4-di(1,2-dilithio-2-phenylethyl)benzene,
1,5-dilithio-3-pentyne, dilithiophenanthrene,
1,2-dilithiotriphenylethane, dilithiomethane,
1,4-dilitiho-1,1,4,4-tetraphenylbutane,
1,4-dilithio-1,4-diphenyl-4-dinaphthylbutane
and the like The preferred organo dilithium initiators are the adducts of lithium with, 1,2-diphenylethylene (lithium-stilbene adduct) and the dilithium adducts of conjugated dienes such as for example dilithium adducts of 2,3-dimethyl-1,3-butadiene, butadiene or isoprene containing up to 10, preferably less than 7, conjugated diene units.

The polymerization of the conjugated diene in the presence of the dilithium organo initiator is carried out in a suitable diluent such as benzene, toluene, cyclohexane, methylcyclohexane, xylene, n-butane, n-hexane, n-heptane, isooctane and the like. Generally, the diluent is selected from hydrocarbons, for example, paraffins, cycloparaffins and aromatics containing from 4 to 10 carbon atoms per molecule. In the preparation of polymers containing low vinyl content, a substantial portion or all of the polar solvent in which the organo dilithium initiator is prepared should be removed prior to charging the initiator to the hydrocarbon diluent in which the polymerization is carried out. The monomer is then charged and the polymerization is conducted in an inert atmosphere such as nitrogen or argon. In the event the polymerization initiator is soluble in a polar solvent but not in a hydrocarbon diluent, a small amount of the monomer can be charged and allowed to polymerize while still in the presence of the polar solvent. The resulting product will then be soluble in the hydrocarbon diluent.

In the polymerization to form polymer having low vinyl content it is preferred that a conjugated diene be employed in a major amount of the monomers used. The amount of initiator which is used varies depending upon the polymer prepared and particularly upon the molecular weight desired. Usually the terminally reactive polymers thus formed are liquids having molecular weights in the range of about 1000 to 20,000; however, depending upon the monomers and the amount of initiator used semi-solid or even solid terminally reactive polymers can be prepared having molecular weights up to 150,000 and higher. Usually the initiator is employed in amounts between about 0.25 and about 100 millimoles per 100 grams of monomer.

The temperature for the polymerization is generally in the range of —100 to 150° C. and preferably between —75 and 75° C. The particular temperature employed depends on both the monomers and initiators used in the polymerization. It is preferred that the amount of initiator be in the range of about 1 to about 30 millimoles per 100 grams of monomers. The pressure of the reaction need be only that necessary to maintain the materials in the liquid phase.

The product of the polymerization is a solution of the polymer containing at least two terminal lithium atoms per molecule dissolved in the hydrocarbon solvent generally in concentrations in the range of about 3 to 20 weight percent. Polymer solutions of this concentration are then reacted to replace the lithium atoms on the polymer with more stable reactive groups such as —SH, —OH, —COOH, halogen, or the like. Treating the unquenched solution with carbon dioxide introduces carboxy groups on the ends of the polymer molecule. Hydroxy telechelic polymers can be prepared by treating the unquenched polymer solution with epoxy compounds. Also the polymer solutions can be reacted with compounds containing active halogen atoms. For example, bis-chloromethyl ether reacts with lithium telechelic polymer to produce polymers that contain active chlorine atoms on the ends of the polymer molecule. The resulting terminally reactive polymers can then be recovered and coupled with specific coupling and/or curing systems either with or without conventional curatives such as sulfur or dicumyl peroxide. For example, carboxy telechelic polymers can be coupled with tri(aziridinyl)-phosphine oxides or sulfides such as tri(2-methyl-1-aziridinyl)phosphine oxide, and hydroxy telechelic polymers can be coupled with polyisocyanates such as tolylene-2,4-diisocyanate.

One of the preferred methods of preparing telechelic polymers is by reacting the solutions of the lithium containing polymers with dry, gaseous carbon dioxide under conditions which provide intimate and turbulent mixing. It has been found that this type of mixing and contacting between the carbon dioxide and the polymer solutions can most advantageously be obtained by using a mixing T wherein the polymer solutions is fed into one leg of the T, the carbon dioxide into the other and the carbonated solution is removed from the third leg of the T. The viscosity of the polymer solution should be relatively low in order to improve the contacting which can be obtained under these conditions. Extremely dilute solutions can be used but it is desirable to minimize the bulk of the solution being treated. It has been found that the solutions which are obtained as a result of polymerizing in the substantial absence of a polar solvent tend to be rather viscous and are often difficult to carbonate. The addition of a relatively small amount of an aliphatic or cyclic mono- or polyether or a trialkylamine to a viscous hydrocarbon solution of a conjugated diene polymer containing terminal alkali metal atoms greatly reduces the viscosity of the solution and facilitates subsequent reaction with various types of reagents. In the case of carbonation with carbon dioxide, much higher carbonating rates can be obtained with solutions which have been fluidized according to this invention. With the fluidized solutions, lower flow rates of carbon dioxide can be used to obtain as high or higher over-all carboxy content of the final polymer. Also, a lower viscosity tends to keep coupling reactions to a minimum and facilitates carrying out the reaction in order to get a product of the desired specification.

The fluidizing agents which are employed include aliphatic and cyclic mono- and polyethers and trialkylamines. They must be compounds which will not react with the lithium on the ends of the polymer chains. Preferably, the fluidizing agents are compounds which contain from 2 to 24 carbon atoms per molecule. Illustrative of these compounds are the following: dimethyl ether, methyl ethyl ether, diethyl ether, di-n-propyl ether, methyl isopropyl ether, ethyl n-butyl ether, di-n-amyl ether, didodecyl ether, ethylene glycol dimethyl ether, ethylene glycol diethyl ether, ethylene glycol methyl ethyl ether, ethylene glycol methyl tert-butyl ether, ethylene glycol ethyl n-butyl ether, ethylene glycol di-n-propyl ether, trimethylene glycol diethyl ether, diethylene glycol ethyl isopropyl ether, glycerol triethyl ether, glycerol diethyl n-amyl ether, tetrahydrofuran, 1,4-dioxane, trimethylamine, triethylamine, tri-n-butylamine, trioctylamine, and methyldiethylamine. Of the compounds which are applicable, tetrahydrofuran, ethylene glycol dimethyl ether, and 1,4-dioxane are among those which are preferred since they have a greater fluidizing effect than some of the other compounds.

The amount of fluidizing agent used will depend upon the compound chosen, the viscosity of the polymer solution, and the effect desired. It will generally be in the range from 0.05 to 15 percent of the total volume of solution. Excellent results are usually obtained with less than 10 percent by volume of fluidizing agent, frequently with less than 5 percent, based on the total volume of solution. This effect is not one merely of dilution, as is obvious from the fluidizing effect obtained with such a small amount of fluidizing agent used. Furthermore, addition of the same amount of hydrocarbon diluent produces no noticeable effect.

The temperature of the carbonation with dry gaseous carbon dioxide should be below 60° F. and preferably about 30° F. or below. This temperature is best obtained by cooling the solution to about −60 to 60° F. and preferably below 45° F. before introducing it into the mixing T. Additional cooling is supplied by expansion of the excess carbon dioxide gas although auxiliary external cooling can be supplied if desired.

Since the alkali metal salt of the carboxy-telechelic polymer is normally insoluble in the polymerization diluent the carbonated polymer mixture issues from the downstream leg of the mixing T in the form of a dispersion of very finely divided gel, having the appearance of snow. This dispersion can be easily handled by pumps and can be transferred through piping to storage facilities.

The final step in preparing the carboxy-telechelic polymer is to treat the alkali metal salt with a suitable reagent, such as an acid, to convert the metal salt groups to carboxy groups. Any material containing an active hydrogen more reactive than the hydrogen of the carboxy group can be used for this replacement. Generally a dilute inorganic acid such as hydrochloric, phosphoric or sulfuric acid is most suitable.

The acid conversion step can follow the carbonation step immediately or it can be delayed several hours, storing the polymer meanwhile in its salt form. After acidification the polymer redissolves and is separated from the organic solvent by conventional techniques. This polymer form can be coupled by reacting as described above and the polymer can be compounded with its coupling and curing agent in a conventional manner using a roll mill or a Banbury mixer. Materials such as carbon black or mineral fillers can be incorporated into the mixture if desired and curing can be effected at about 200 to 500° F. generally for about 20 to 150 minutes. Products thus prepared are useful as adhesives, potting compounds, sealants, treadstocks, and for many types of molded objects.

The advantages of this invention are further illustrated by the following examples. The reactants and their proportions and other specific conditions are presented as being typical and should not be construed to limit the invention unduly.

Example 1

Lithium was reacted with dimethylbutadiene using the following proportions of ingredients:

| | |
|---|---|
| 2,3-dimethyl-1,3-butadiene, mole | 0.40 |
| Lithium wire, gram atom | 0.80 |
| 1,2-diphenylethylene[1], mole | 0.01 |
| Diethyl ether, ml. | 350 |
| Temperature, °F. | 75 |
| Time, hours | 3 |

[1] Trans-stilbene.

The reaction was effected in an atmosphere of nitrogen. The materials were charged to a reactor and stirred vigorously throughout the three-hour reaction period. Titration of a sample with 0.1 N HCl showed that the adduct had a molarity of 0.50. Two tenths mole of dimethylbutadiene was added, the mixture was stirred another hour, and a second 0.2 mole portion of dimethylbutadiene was introduced. After stirring an additional hour, the solution had a molarity of 0.89, as shown by titration with 0.1 N HCl. Two hundred milliliters of diethyl ether was removed by distillation and 0.8 mole of 1,3-butadiene was added and allowed to react. The product was dissolved in 500 milliliters of toluene and titrated again. It was 0.4 molar. This adduct was employed as the initiator for the polymerization of butadiene. Recipes were as follows:

|  | 1 | 2 |
| --- | --- | --- |
| 1,3-Butadiene, parts by weight | 100 | 100 |
| Toluene, parts by weight | 1,200 | |
| Cyclohexane, parts by weight | | 1,200 |
| Initiator, millimoles | 20 | 20 |
| Temperature, °F | 122 | 122 |
| Time, hours | 2 | 2 |
| Conversion, percent | 100 | 100 |

Charge order: Solvent; nitrogen purge; butadiene; initiator.

The unterminated polymer solutions were very viscous which made carbonation difficult. Addition of about 50 parts by weight of diethyl ether per 100 parts of butadiene charged to the polymerization fluidized the solutions and greatly facilitiated carbonation. This amount of ether represented about 4 percent by volume of solution.

Each fluidized polymer solution was carbonated using a T-tube. Carbon dioxide, under a pressure of 15–18 p.s.i.g., and the polymer solution were fed into separate arms of the tube where they were mixed. Transfer of the polymer solution into the T-tube was effected by nitrogen under a pressure of 20 p.s.i.g. An instantaneous reaction occurred upon contact of carbon dioxide with the fluidized polymer solution. The reaction mixture was transferred to an open vessel through the third arm of the tube. An excess of dilute hydrochloric acid was added, the aqueous and organic phases were separated, the organic phase was washed with water, and the carboxy-containing polymer was recovered by evaporation of the solvent. Products from both runs were liquids and had the following properties:

|  | 1 | 2 |
| --- | --- | --- |
| Brookfield viscosity at 77° F., poises | 360 | 380 |
| COOH content, percent | 1.22 | 1.26 |
| Microstructure, percent: | | |
| Vinyl | 30.2 | 24.9 |
| Trans | 46.8 | 44.4 |

*Example II*

A polymerization initiator was prepared by first reacting lithium with dimethylbutadiene using the following recipe:

| | |
| --- | --- |
| 2,3-dimethyl-1,3-butadiene, mole | 0.8 |
| Lithium wire | Excess |
| Trans-stilbene, mole | 0.03 |
| Diethyl ether, ml. | 800 |
| Temperature, °F. | 75 |
| Time, hours | 2 |

The procedure was similar to that described in Example I. After two hours, 0.4 mole of dimethylbutadiene was added, the mixture was stirred one hour, another 0.4 mole portion of dimethylbutadiene was added, and the reaction was continued two more hours. Ether was removed by distillation while a constant flow of argon was maintained through the system. The solid residue was dissolved in one liter of cyclohexane. Molarity of the solution, determined by titration with 0.1 N HCl, was 0.22. This solution was used as the initiator for the polymerization of butadiene in accordance with the following recipe:

| | |
| --- | --- |
| 1,3-butadiene, parts by weight | 100 |
| Cyclohexane, parts by weight | 1000 |
| Lithium-dimethylbutadiene adduct, millimoles | 22 |
| Temperature, °F. | 122 |
| Time, hours | 2.5 |
| Conversion, percent | 100 |

Charge order: Cyclohexane; nitrogen purge; butadiene; styrene; initiator.

The reaction mixture was very viscous but became fluid upon addition of 20 parts by weight of tetrahydrofuran per 100 parts of butadiene charged to the polymerization. This amount of tetrahydrofuran represented 1.5 percent by volume of solution. It was carbonated and the polymer recovered as described in Example I. Properties of the product were as follows:

| | |
| --- | --- |
| Brookfield viscosity at 77° F., poises | 480 |
| COOH content, percent | 1.35 |
| Microstructure, percent: | |
| Vinyl | 18.8 |
| Trans | 44.5 |

*Example III*

Polybutadiene was prepared using as an initiator a lithium-methyl-naphthalene - isoprene - butadiene adduct charged in amount of 27 millimoles per 100 parts by weight of monomer.

The lithium telechelic polymer which was prepared in the substantial absence of a polar solvent was carbonated on a continuous basis by passing a solution of the polymer through a mixing T together with gaseous carbon dioxide. The resulting product was a white, snowy carbonated material issuing from the third leg of the mixing tube.

In the first run in which no fluidizing agent was added, a slow carbonation was required with a high level of carbon dioxide to give a product of good appearance. In the second run with 1 part by weight of tetrahydrofuran added per 100 parts of monomer, approximately equivalent to 100 parts by weight of polymer, very good carbonation was obtained with substantially higher flow rates of the polymer solution and much less carbon dioxide. The total time for carbonation with the fluidized solution was much less than for the same amount of solution to which the tetrahydrofuran had not been added. The results are shown in the following table.

|  | Run I | Run II |
| --- | --- | --- |
| Tetrahydrofuran, parts | | 1.0 |
| Solution rate, g.p.m | 1 | 6.25 |
| $CO_2$ used, pounds | 169 | 40.5 |
| $CO_2$ rate, lbs./min | 3 | 4.4 |
| Total carbonation time, hrs | 0.94 | 0.15 |
| COOH, percent | 1.1 | 1.1 |
| Viscosity, poise, 77° F | 1,060 | 1,140 |

As will be apparent from the above disclosure, various modifications can be made in my invention without departing from the spirit or the scope thereof.

I claim:

1. A method of fluidizing a solution of polymer obtained by contacting an organo polylithium initiator containing 2 to 4 lithium atoms per molecule with a conjugated diene having from 4 to 12 carbon atoms per molecule in a hydrocarbon solvent in the substantial absence of polar solvent which comprises contacting said solution at the end of the polymerization with from 0.05 to 15 volume percent based on the total solution of a material having from 2 to 24 carbon atoms per molecule and selected from the group consisting of aliphatic ethers, cyclic ethers and trialkylamines.

2. The method of claim 1 wherein said polymer is polybutadiene and said material is tetrahydrofuran.

3. The method of claim 1 wherein said polymer is a copolymer of butadiene and styrene and said material is diethyl ether.

4. The method of claim 1 wherein said polymer is polyisoprene and said material is 1,4-dioxane.

5. The method of claim 1 wherein said polymer is polybutadiene and said material is ethylene glycol dimethyl ether.

References Cited by the Examiner

UNITED STATES PATENTS

| | | | |
|---|---|---|---|
| 2,146,447 | 2/39 | Scott | 260—93.5 |
| 2,352,461 | 6/44 | Walker | 260—533 |
| 2,366,460 | 1/45 | Semon | 260—94.7 |
| 2,631,175 | 3/53 | Crouch | 260—94.2 |
| 2,913,444 | 11/59 | Diem et al. | 260—82.1 |
| 2,975,160 | 3/61 | Zelinski | 260—83.7 |

OTHER REFERENCES

Ziegler, "Rubber Chem. and Tech.," 1938, pages 501-7.

JOSEPH L. SCHOFER, *Primary Examiner.*

DONALD J. ARNOLD, LEON J. BERCOVITZ, *Examiners.*